United States Patent
Mueller et al.

(10) Patent No.: US 6,167,606 B1
(45) Date of Patent: Jan. 2, 2001

(54) METHOD FOR TIGHTENING A SCREW CONNECTION BY MEANS OF AN IMPACT SCREWDRIVER HAVING A VARIABLE SPEED ELECTRIC DRIVE MOTOR

(75) Inventors: Gerold Mueller, Stuttgart; Peter Wolf, Leinfelden-Echterdingen; Heinz Veitinger, Murrhardt, all of (DE)

(73) Assignee: Robert Bosch GmbH, Struttgart (DE)

(*) Notice: Under 35 U.S.C. 154(b), the term of this patent shall be extended for 438 days.

(21) Appl. No.: 08/573,247

(22) Filed: Dec. 15, 1995

(30) Foreign Application Priority Data

Feb. 3, 1995 (DE) .............................................. 195 03 524

(51) Int. Cl.$^7$ .................................................. B23Q 17/00
(52) U.S. Cl. ...................................... 29/407.02; 173/181
(58) Field of Search ................. 29/407.02; 173/176–181

(56) References Cited

U.S. PATENT DOCUMENTS

| | | |
|---|---|---|
| 3,969,810 | 7/1976 | Pagano . |
| 5,131,130 * | 7/1992 | Eshghy ............................. 29/407.02 |
| 5,181,575 * | 1/1993 | Maruyama et al. ............. 173/181 X |
| 5,216,795 * | 6/1993 | Hansson ............................. 29/407.02 |
| 5,439,063 * | 8/1995 | Anders et al. ....................... 173/177 |
| 5,457,866 * | 10/1995 | Noda .................................. 29/407.02 |
| 5,492,185 * | 2/1996 | Schoeps et al. ................. 173/181 X |

FOREIGN PATENT DOCUMENTS

| | | |
|---|---|---|
| 0 460 920 A1 | 6/1991 | (EP) . |
| WO 92/03665 | 3/1992 | (WO) . |

* cited by examiner

*Primary Examiner*—David P. Bryant
(74) *Attorney, Agent, or Firm*—Michael J. Striker

(57) ABSTRACT

The screwdriving device (9) according to the invention has a control device (22) which uses a sensor system (18) to determine a characteristic variable (K) which characterizes a screwdriving moment ($M_v$) of the screw connection (10) and/or an emitted moment (M) of the impact screwdriver, during or after at least one pulse emission from the impact screwdriver to the screw connection, and defines a drive variable, for example a required drive speed (n) for the next impulse emission, as a function of the determined characteristic variable ($K_i$). In this case, the drive variable (n) is initially set to a value which corresponds to a value ($K_0$) to be expected of the characteristic variable (K) and its magnitude is in any case less than a desired value ($K_{req}$) for the final screw connection state. This prevents the desired screwdriving moment being exceeded even after the first impulse emission in the event of unfavorable screwdriving conditions. Instead of this, the desired final screw connection state is approached step by step, in a controlled manner.

2 Claims, 3 Drawing Sheets

METHOD FOR TIGHTENING A SCREW CONNECTION BY MEANS OF AN IMPACT SCREWDRIVER HAVING A VARIABLE SPEED ELECTRIC DRIVE MOTOR

BACKGROUND OF THE INVENTION

The invention is based on an impact screwdriver, and on a method for tightening a screw connection by means of the impact screwdriver. Impact screwdrivers are already known which, in contrast to conventional screwdrivers, exert a tightening moment in the form of impulses on the screw connection, which has the advantage that relatively high tightening and releasing torques for screw connections can be applied with relatively little drive power and with a small holding moment having to be applied. It is disadvantageous in the case of such impact screwdrivers that the achievable tightening torque of the screw connection is subject to relatively severe fluctuations as a function of the particular screwdriving action (hard/soft) and as a function of friction influences. Relatively wide tolerances therefore have to be defined for screw connections which have to be tightened using impact screwdrivers. If there is any doubt, a screw connection must be designed more stringently by the designer than would be necessary in the event of a torque which can be maintained exactly.

DE 42 43 069 A1 discloses an impact torque in the case of which the impulses or rotation angle of the screwdriver are counted, in addition to detecting the torque, in order to turn the impact tool off, the impulses counted or the rotation angle determined up to completion of the screwdriving process additionally being intended to be used for determining the quality of the screw connection. Even when incorrectly tightened screw connections can be identified in this way, then neither is the tolerance band reduced nor is the creation of faulty screw connections reduced in the case of this impact tool. However, in present-day manufacture, the avoidance of faults is gaining a far greater importance because of the high fault rectification costs.

SUMMARY OF THE INVENTION

The impact screwdriver according to the invention, and the method according to the invention in contrast have the advantage that greater accuracy can be achieved in terms of the achievable tightening torque of the screw connection, as a result of which tighter tolerances can be maintained for the screw connection. Furthermore, the creation of incorrectly tightened screw connections is largely avoided.

BRIEF DESCRIPTION OF THE DRAWINGS

An exemplary embodiment of the invention is explained in more detail in the drawing and in the following description.

DESCRIPTION OF THE EXEMPLARY EMBODIMENT

Figure 1:
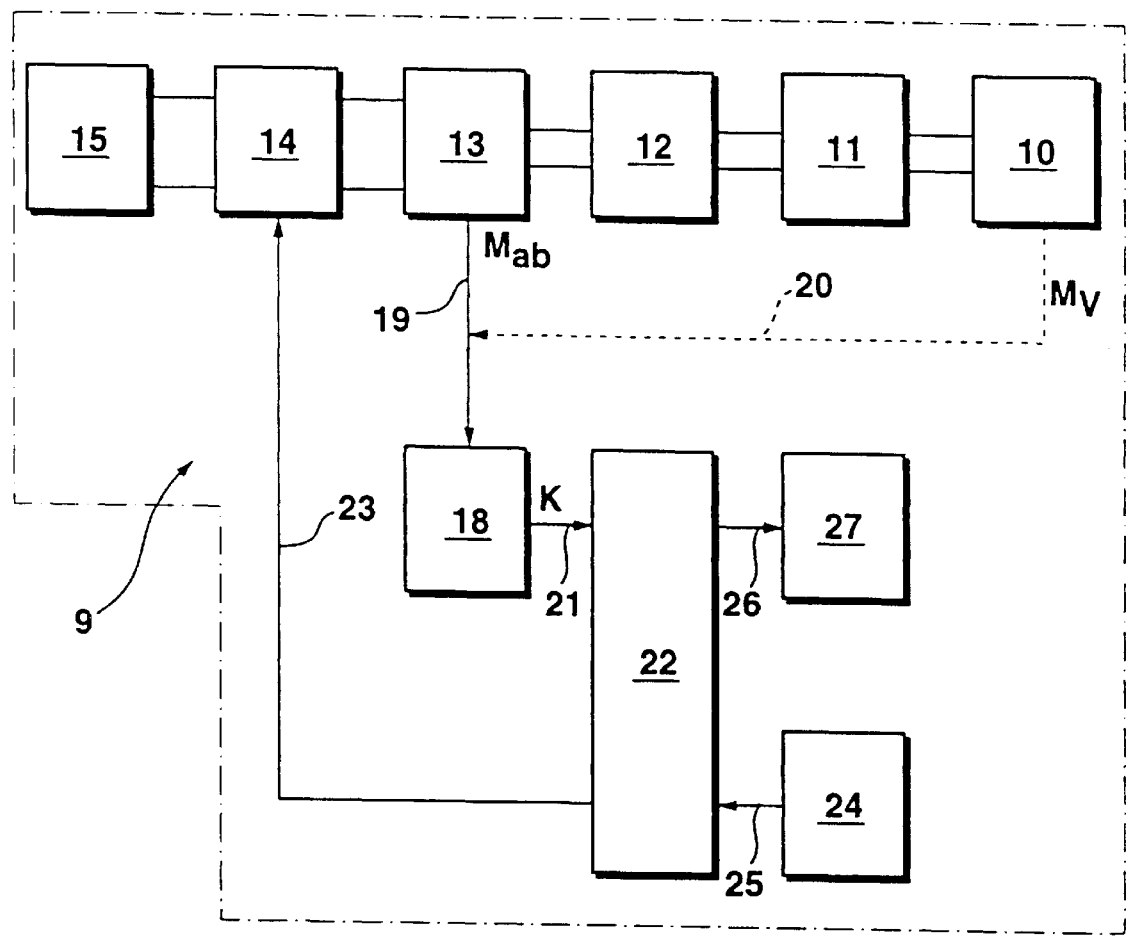
FIG. 1 shows a diagram of an impact screwdriver.

In FIG. 1, 10 designates a screw connection which is to be tightened by means of an impact screwdriver 9. The impact screwdriver 9 has an impact mechanism 11 which can be driven by a drive motor 13, via a gearbox 12. The drive motor is supplied with electrical drive power from a power source 15, for example an accumulator, via a power stage 14. The impact screwdriver 9 furthermore has a sensor system 18 which determines the current value of a characteristic variable K, the characteristic variable K characterizing an emitted moment $M_{ab}$ of the impact screwdriver and/or a screwdriving moment $K_v$ of the screw connection 10. For this purpose, the sensor system 18 is connected via a first connection 19 to the drive motor 13 and/or via a second connection 20, which is indicated by dashed lines in FIG. 1, to the screw connection 10. The manner in which the value of the characteristic variable K is determined will be described in more detail later.

For its part, the sensor system 18 is connected via a third connection 21 to a control device 22. The control device 22 evaluates those values of the characteristic variable K which are determined by the sensor system 18 and sends corresponding control commands via a fourth connection 23 to the power stage 14, which then drives the drive motor 13 in an appropriate manner.

The control device 22 furthermore has an input device 24 by means of which the operator of the impact screwdriver 9 can predetermine the desired sequence of the screwdriving process via a fifth connection 25 of the control device 22. There is a sixth connection 26 between the control device 22 and an indication device 27 so that, for example, the determined values of the characteristic variable K can be reported to the operator.

The elements 13, 18, 22 and 14 as well as 13, 12, 11, 10, 18, 22 and 14 form a closed control loop. This offers the advantage that it is possible to influence the screwdriving process specifically during tightening depending on the screw connection state and on the screw connection conditions. In this case, the characteristic variable K is picked off by the sensor system 18, depending on the accuracy requirements, either on the drive motor 13 by determining the respectively emitted moment $M_{ab}$, or directly on the screw connection 10 by determining the respectively existing screwdriving moment $M_v$.

In this case, the detection of the screwdriving moment $M_v$ as the characteristic variable K offers the greatest accuracy since, in this case, the screwdriving moment $M_v$ which is actually present in the screw connection 10, that is to say the variable which is to be set during the screwdriving process, is itself determined and this variable can be compared directly with a desired required screwdriving moment $M_{req}$. Methods for determining the screwdriving moment $M_v$ in the screw connection 10 are already known and are not the subject matter of the present application. Thus, for example, it has already been proposed (WO 92/03665) for the screw connection state to be determined using the ultrasound propagation time measurement method. However, this method is relatively complex and is necessary only in the case of very stringent accuracy requirements.

If the requirements placed on the accuracy of the screwdriving moment to be achieved are less stringent, it is sufficient to use as the characteristic variable K a variable which characterizes the emitted moment $M_{ab}$ of the impact screwdriver 9, because the respective achieved screwdriving moment $M_v$ is dependent on the emitted moment $M_{ab}$. However, the respectively prevailing screw connection conditions (for example friction) have an influence in this case, so that the screwdriving moment $M_v$ can be deduced only approximately from the emitted moment $M_{ab}$.

For example, torque sensors accommodated in the drive train can be used to determine the respectively emitted moment $M_{ab}$ as the value for the characteristic variable K. Since this is likewise relatively complex, options are described in the following text covering other ways for detecting a variable which characterizes the emitted moment $M_{ab}$ and which can be used as a characteristic variable K for the screwdriving process.

Figure 2:
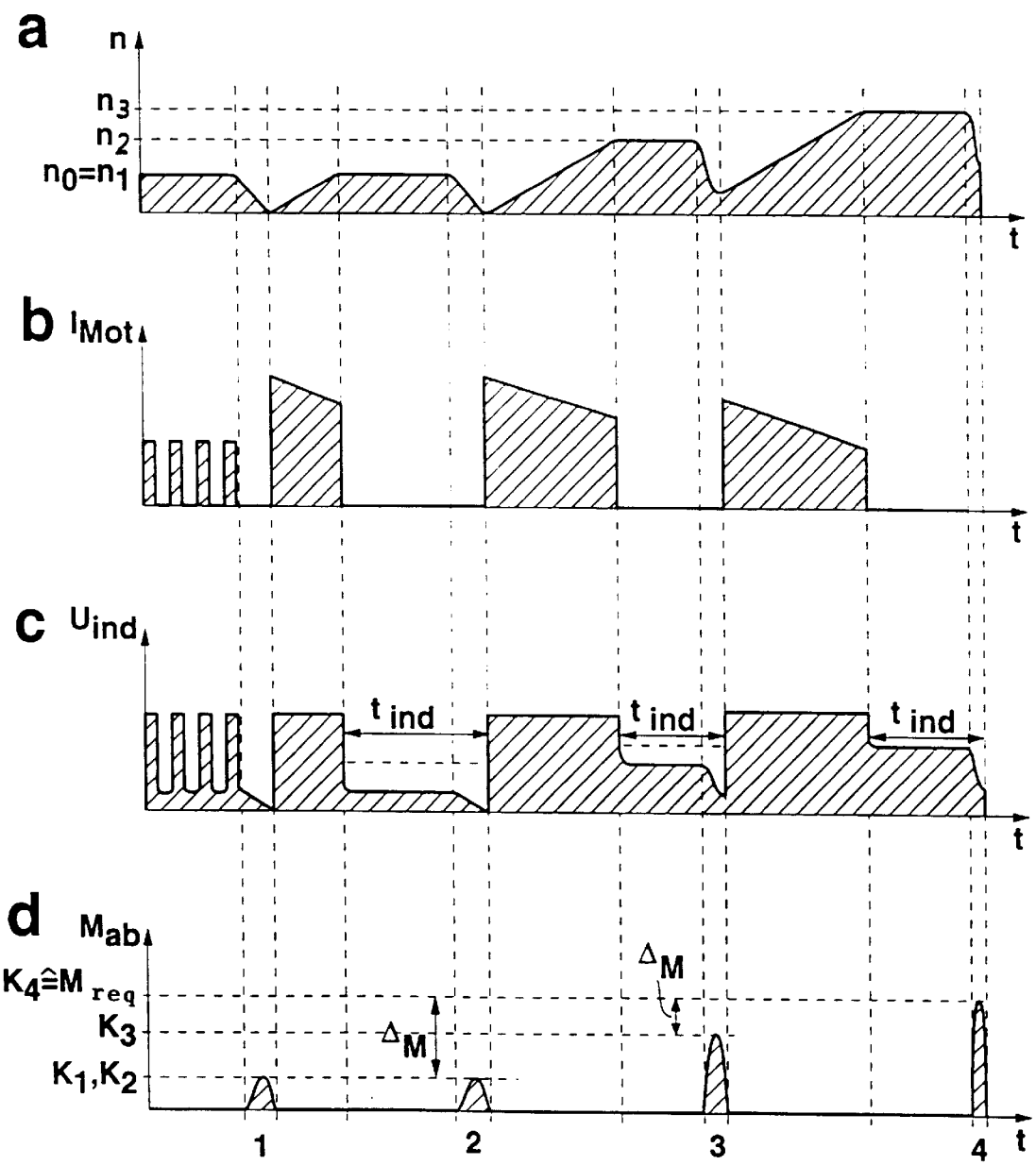
FIG. 2 shows an overview of various drive variables for the impact screwdriver during tightening of a screw connection.

The diagrams a to d in FIG. 2 show various drive variables during the time period of an illustrative screwdriving process, with a total of four impulses being emitted. Diagram A shows the speed n of the drive motor 13, diagram b the profile of the motor current $i_{mot}$, diagram c the profile of the induced armature voltage $U_{ind}$, and diagram d the emitted moment $M_{ab}$. By comparing the diagrams with one another at specific times, it can be seen that there is a relationship between the illustrated variables. The relationship between the drive variables results in further options for determining the emitted moment $M_{ab}$ and thus the characteristic variable K.

The motor speed n as illustrated in diagram a defines the energy which can be taken from the flywheel mass of the drive motor 13. Comparison with diagram d shows that the moment $M_s$ which is emitted to the screw connection 10 as a result of the flywheel mass depends on the rate of change of the motor speed with time $\Delta n/dt$. If the drive motor 13 is being driven while the torque is being emitted, the moment $M_{an}$ applied by the drive motor 13 must also be taken into account. The total emitted moment $M_{ab}$ is then given approximately by the relationship, $$M_{ab} = M_{an} + M_s = c_i^* I_{mot} + J^* d\omega/dt;$$

where $M_{ab}$=emitted moment, $M_{an}$=drive moment applied by the drive motor 13, $M_s$=flywheel moment, $c_i$=motor constant, $I_{mot}$=motor current, j=moment of inertia, $\omega$=angular velocity and t=time.

As can be seen from FIG. 2, diagram a, a specific drop in the motor speed n can be recorded whenever an impulse is emitted, which drop can be detected either by a speed sensor or, according to FIG. 2 diagram c, by measuring the induced armature voltage $U_{ind}$ when no current is flowing through the drive motor 13.

The measurement of the induced armature voltage $U_{ind}$ when no current is flowing through the drive motor 13 during the time period tind allows the emitted moment $M_{ab}$ to be calculated approximately using the relationship:

$$M_{ab} = J/c_i^* dU_{ind}/dt,$$

where $M_{ab}$=emitted moment, J=moment of inertia, $c_i$=motor constant, $U_{ind}$=induced armature voltage, t=time.

Furthermore, it is possible to determine the characteristic variable K by calculation of the emitted moment $M_{ab}$ from the motor current $I_{mot}$ using the following proportionality:

$$M_{ab} = J^* R/c_i^* dI_{mot}/dt + c_i^* I_{mot}$$

where $M_{ab}$=emitted moment, J=moment of inertia, R=equivalent internal resistance, $c_i$=motor constant, $I_{mot}$= motor current.

The emitted moment $M_{ab}$, either determined using one of these described methods or measured directly by means of torque sensors, is now used as the characteristic variable K characterizing the screwdriving process, while the screwdriving moment $M_v$ which is actually present in the screw connection is used as the characteristic variable K in the method described initially. The determination of the respective value of the characteristic variable K is carried out during or after at least one discrete impulse emission from the impact screwdriver 9.

Normally, when screwdriving using impact screwdrivers, the first impulse is not initiated until the screw head reaches the head contact surface and the impact mechanism is in consequence opposed by a considerably greater resistance. If the flywheel mass of the impact screwdriver is set very high because the initial speed $n_0$ of the drive motor 13 has been set too high, it is possible for an excessively high screwdriving moment $M_v$ to be produced in the screw connection 13 even after the first impulse emission from the impact mechanism 11. In order to avoid this, the drive motor 13 according to the invention initially provides a drive speed $n_0$ which in every case produces a lower value $K_0$ of the characteristic variable K after the first impulse emission than that corresponding to the desired value $K_{req}$.

Because of the excessively wide scatter in the stroke action conditions (for example different coefficients of friction in the head contact), using only a single impulse emission for tightening is relatively inaccurate. Particularly in the case when it is difficult to drive the screw in and the drive speed $n_0$ is relatively high because the dynamic moment of inertia is then high and the coefficients of friction are low (sliding friction in the screw head contact instead of stiction), during the transition from screwing the screw in to tightening it, there would additionally be a risk of the required value $K_{req}$ being exceeded in the manner described. For this reason, the screwdriving process is normally carried out in at least two stages. The desired screwdriving moment $M_v$, represented by the characteristic variable $K_{req}$ could, of course, also be achieved even after the first pulse emission if the scatter were reduced or it were possible to detect the influencing factors.

Figure 3:
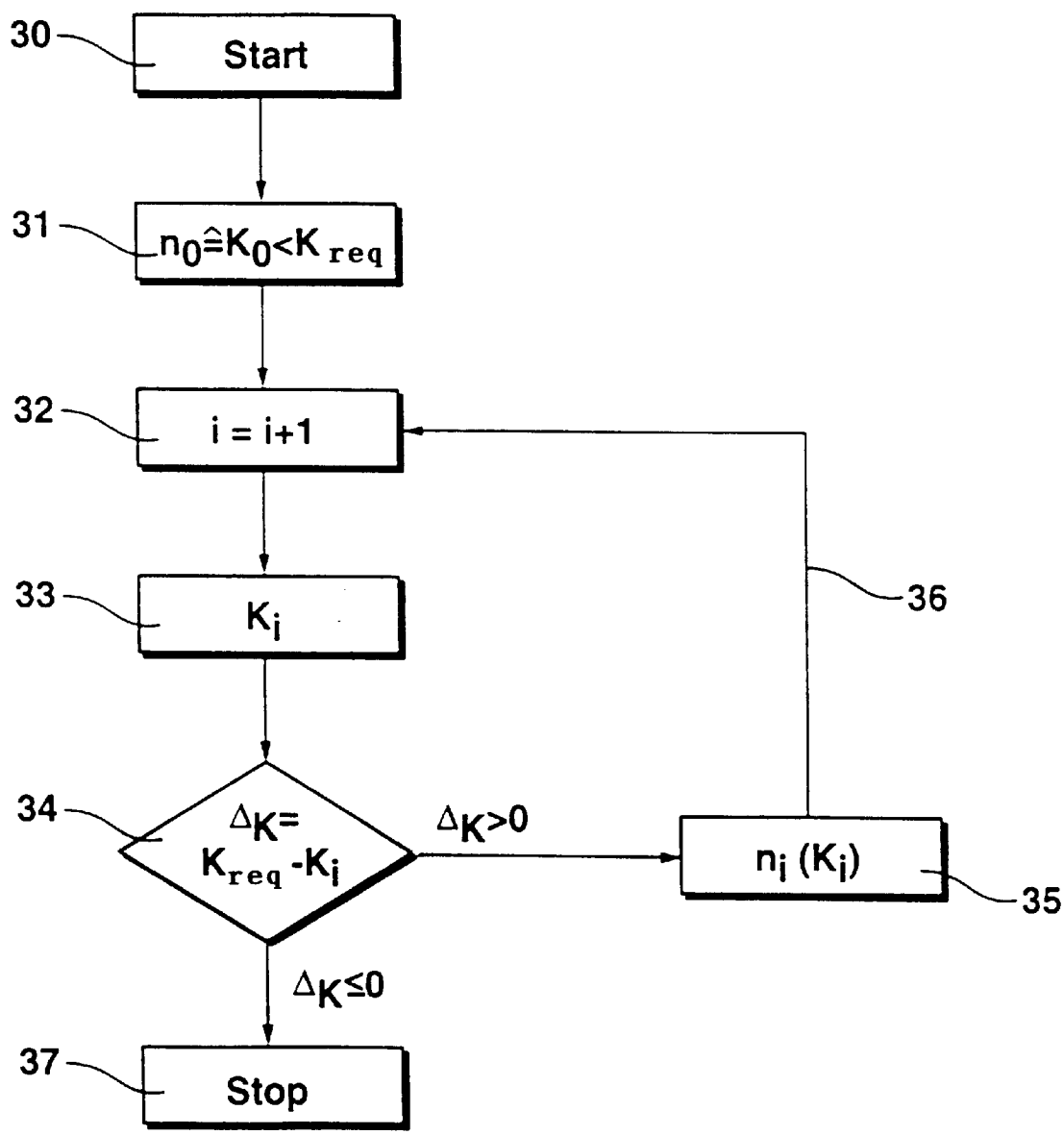
FIG. 3 shows a flowchart relating to a screw insertion method according to the invention.

FIG. 3 shows the screwdriving process according to the invention in the form of a flowchart. The reference number 30 designates a starting process of the tightening method, which then produces the initial speed $n_0$ at number 31 after a starting time, which initial speed corresponds to a value $K_0$ which is less than $K_{req}$ in every case. As a rule, the screw connection is screwed in using this initial speed until the screw head and/or the nut reaches the respective contact. The first impulse emission from the impact mechanism 11 does not occur until this point, since the release moment of the impact screwdriver 9 is then exceeded. This impulse emission is designated by the number 32. During or after this first impulse emission, the sensor system 18 detects the current value Ki, in this case the first value $K_1$ for i=1, which is designated by the reference number 33.

During the subsequent comparison 34, the difference between the desired value $K_{req}$ and the current value $K_i$, that is to say $K_1$ for i=1, of the characteristic variable K is formed. Since, according to the initial condition $K_1$ must be less than $K_{req}$ after the first impulse process, the condition that $\Delta K$ is greater than zero is satisfied. In the method step designated by 35, the control device 22 now defines an appropriate drive speed $n_1$ for the second impulse emission 32, as a function of the current value of $K_1$. This is done, for example, by means of an algorithm which is programmed in the control device 22 or by means of a value table stored therein. The algorithm or value table are in this case matched to the respective method of determining the characteristic variable K.

A second impulse 32 is then emitted (i=2), as a result of which a second value is in turn produced for $K_2$ which is determined in accordance with step 33. The comparator 34 then once again forms a difference, either passing through the loop 36 once again with a new drive speed $n_2$ being reset, or the screwdriving process being interrupted if the condition $\Delta K \leq 0$ is satisfied (step 37). Overall, the sequence passes through the loop 36 as often as is necessary until the said condition $\Delta K \leq 0$ is satisfied.

In this way, it is possible to approach the desired final screw connection state $K_{req}$ step by step in at least two stages. In this way, the influence of the scatter of the screw connection conditions is reduced. Via the input device 24, the user can vary in a desired manner the algorithm on which the definition 35 of $n_i$ is based, in particular defining a specific screwdriving method sequence. Thus, the drive speed $n_i$ can be increased as the number of programmed impulse emissions is increased, and can be reduced again, earlier or later. In the case of the screw insertion process which is illustrated by way of example in FIG. 2, the drive speed $n_1$ according to diagram a after the first impulse emission i=1 is once again initially changed to the initial value no and then, after the second impulse emission i=2, is changed to $n_2$ and is then increased further, after the third pulse emission i=3, to $n_3$, until the condition $\Delta K \leq 0$ is satisfied after the fourth impulse emission, and the screw-driving process is interrupted. The values $K_i$ of the characteristic variable K which in each case correspond to the emitted moment $M_{ab}$ are shown in diagram d.

The indication device 27 makes it possible to provide the operator with information about the correct sequence of the tightening method. Approaching the desired screwdriving moment step by step allows different screw connection conditions to be compensated for in a self-regulating manner. The respectively prevailing screw connection state can be detected by the screwdriver controller 22, and the respective drive variable, for example n or $I_{mot}$, can be defined specifically and automatically.

What is claimed is:

1. A method of tightening a screw connection in at least two stages by an impact screwdriver having a variable speed electric drive motor and an impact mechanism which is driven by the drive motor and emits moment producing impulses, the method comprising the steps of determining at least one characteristic variable selected from the group consisting of a variable characterizing a screwdriving moment of the screw connection and a variable characterizing an emitted moment of the impact mechanism during or after an impulse emission from the impact screwdriver; setting a drive variable to a first value in a first stage at least for a first impulse emission, which first value corresponds to a first value to be expected of the at least one characteristic variable and whose magnitude is less than a desired value of the at least one characteristic variable for a final screw connection state; determining a current value of the at least one characteristic variable during or after the first impulse emission; defining a value of the drive variable as a function of the determined value of the at least one characteristic variable in at least one further stage during the tightening process; and interrupting the tightening process when the desired value of the at least one characteristic variable is reached, said at least one characteristic variable being a drop of speed of said variable-speed electric drive motor per time during or after an impulse emission.

2. A method of tightening a screw connection in at least two stages by an impact screwdriver having a variable speed electric drive motor and an impact mechanism which is driven by the drive motor and emits moment producing impulses, the method comprising the steps of determining at least one characteristic variable selected from the group consisting of a variable characterizing a screwdriving moment of the screw connection and a variable characterizing an emitted moment of the impact mechanism during or after an impulse emission from the impact screwdriver; setting a drive variable to a first value in a first stage at least for a first impulse emission, which first value corresponds to a first value to be expected of the at least one characteristic variable and whose magnitude is less than a desired value of the at least one characteristic variable for a final screw connection state; determining a current value of the at least one characteristic variable during or after the first impulse emission; defining a value of the drive variable as a function of the determined value of the at least one characteristic variable in at least one further stage during the tightening process; and interrupting the tightening process when the desired value of the at least one characteristic variable is reached, said at least one characteristic variable being a profile of an induced armature voltage of the variable speed electric drive motor when no current is flowing through the variable speed electric drive motor.

* * * * *